3,390,341
VOLTAGE SENSITIVE INTEGRATION CIRCUIT

Kenneth H. Kline, Canoga Park, Calif., assignor to North American Rockwell Corporation, a corporation of Delaware
Filed July 24, 1964, Ser. No. 384,978
3 Claims. (Cl. 328—127)

ABSTRACT OF THE DISCLOSURE

This disclosure relates to an integration circuit which is voltage sensitive so that the time constant is varied as a function of the magnitude of the applied voltage. The circuit includes a variable time impedance connected in series with a resistor of comparatively small magnitude which in turn is connected to the input of an operational amplifier. A feedback capacitor is connected between the input and output of the amplifier in a conventional manner.

---

This invention relates generally to integrating circuits and more particularly to integrating circuits utilizing a nonlinear device to render the time integral of the integration performed a function of the magnitude of the applied signal.

In automatic pyrometer systems such as that disclosed in my copending application Ser. No. 213,537, now abandoned, entitled "Method and Apparatus for Measuring Radiation Intensity," filed July 30, 1962, considerable difficulty is encountered because of the jitter of the readout meter resulting from the noise from the detector at a balanced condition. This jitter can be minimized by using an integrator with a long time constant but such an arrangement is particularly troublesome when a large change of temperature is detected by the photoelectric pyrometer since large times are required before a balanced condition is obtained.

Therefore, it is the primary purpose of the present invention to provide a nonlinear integrator which, when utilized in the above-referenced pyrometer system, enables that system to come to a fast balance after a large change of temperature has been detected.

The present invention provides a nonlinear or a voltage sensitive device particularly adapted to vary the time constant of an integrating circuit as a function of the magnitude of the applied signal.

It is therefore an object of the present invention to provide a non-linear integrator particularly adapted to eliminate undesired jitter in a photoelectric pyrometer.

It is another object of the prensent invention to provide a circuit having a variable impedance network in the input of a standard integrator so that a change in the input voltage results in a change in the integrating time constant.

Figure 1:
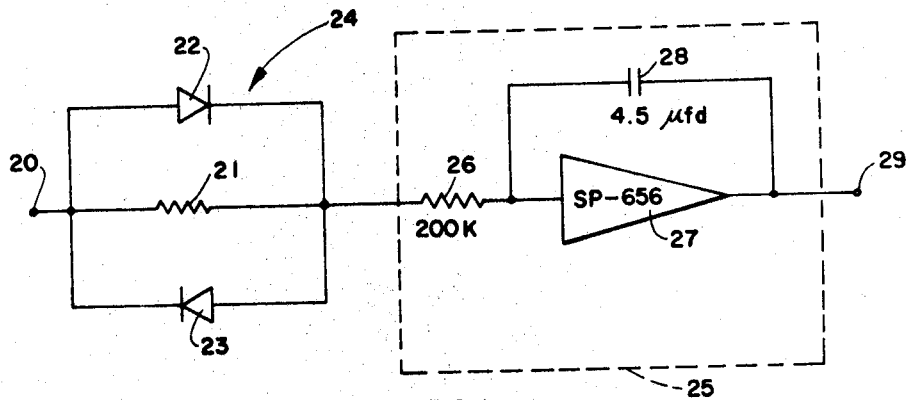
Figure 2:
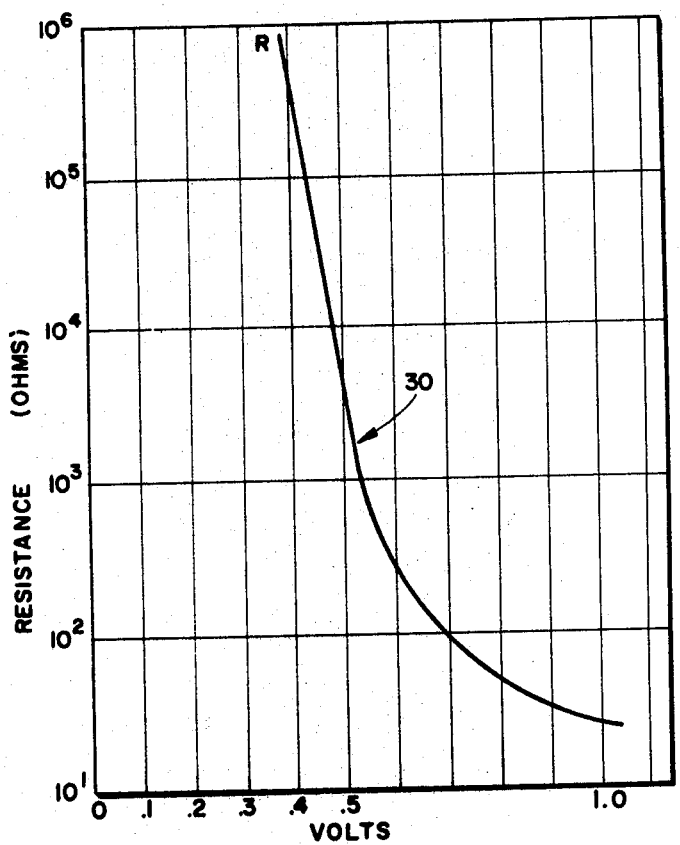

These and other objects of the present invention will become more apparent from the following detailed description of the present invention taken together with the drawings, hereby made a part thereof, in which:

FIG. 1 is a circuit diagram of the non-linear integrator of the present invention; and FIG. 2 is a graph showing the operation of the non-linear device of FIG. 1.

The system comprises generally a variable time impedance connected in series with a resistor of comparatively small magnitude which in turn is connected to the input of an operational amplifier. A feedback capacitor is connected between the input and output terminals of the amplifier in a conventional manner.

Referring now to FIG. 1 specifically, the circuit of the present invention comprises an input 20, which may be connected to the output of the synchronized demodulator in the above-referenced copending application, and is connected to a one megohm resistor 21 having connected in parallel therewith two oppositely poled diode shunt paths 22 and 23. One of the diodes is provided for one polarity input signal and the other diode for the opposite polarity input signal. The diodes in paths 22 and 23 are preferably IN456 or similar low leakage types having a back resistance greater than one megohm. This nonlinear sensitive device, indicated generally at 24, is connected in series with a standard integrating circuit 25 having an input resistor 26 of a magnitude small compared to the magnitude of resistor 21, i.e., an order of magnitude difference. Resistor 26 is connected to the input of an operational amplifier 27 and to a feedback capacitor 28 connected between the input of amplifier 27 and the output 29 of integrating circuit 25.

In operation, when an imput voltage of a given polarity exceeds the forward blocking voltage of the associated diodes in path 22 or 23 the diode commences conduction and provides a path around the resistor 21, the dynamic resistance being inversely dependent upon the magnitude of the input signal at 20. The time constant of the integration is a function of the values of resistors 21 and 26 and capacitor 28. Thus, for example, the time constant is about 5 sec. when the input signal has a magnitude of about .4 v., whereas the time constant is reduced to .9 sec. when the input signal is greater than 1 volt.

If the input signal is of such a magnitude that the associated diode does not conduct, the effective resistance determining the time constant of the integrator 25 is the sum of the two above-mentioned resistances. It is therefore apparent that since the diodes in paths 22 and 23 have forward conducting characteristics which vary from a megohm or more with a few millivolts across them to the order of about twenty ohms with a volt across them, the integrating time constant will be large for small signals and short for large signals.

This characteristic is more clearly shown in the graph of FIG. 2 where the operating characteristics of one diode path is shown in terms of the relationship between the effective resistance of the nonlinear device 24 and the applied signal. Thus, curve 30 shows that as the applied voltage increases the resistance is a nonlinear function of the voltage approaching a low resistance value of about 20 ohms for applied signals of 1 volt or greater. The other diode path has the same characteristics in that the resistance decreases for larger negative polarity voltage signals. Therefore, the time constant, being dependent upon the effective resistance value of nonlinear circuit 24, is effectively varied in a predetermined manner dependent upon the magnitude of the applied signal.

It is a key feature of the present invention that the magnitude of the integrating time constant is dependent upon the values of resistors 21 and 26 and that no other resistances are utilized in establishing this time constant thereby minimizing components and increasing system reliability.

The present invention is not limited to the specific details of the particular embodiments described, since many modifications will be apparent to those skilled in the art, the scope of the present invention being limited only by the appended claims.

I claim:

1. A nonlinear integrator comprising a network consisting of a resistor having one end adapted to be connected to a source of input voltage and the other end connected to an integrating circuit, said resistor having connected in parallel therewith a pair of oppositely poled diode shunt paths, said integrating circuit having an input resistor having a value small compared to said first resistor.

2. Means for varying the time constant of an integrating circuit, said means having an input adapted to be connected to a source of input voltage and an output connected to the input of said integrating circuit, and a pair of oppositely poled diode shunt paths connected in parallel with a resistor, said resistor being connected between said input and said output of said means.

3. A nonlinear voltage sensitive circuit adapted to vary the time constant of an integrating circuit comprising a variable input impedance means connected in series with the input resistor of said integrating circuit, said variable input impedance means comprising a fixed value resistor having connected in parallel therewith a pair of oppositely poled diode shunt paths, so that when a voltage applied to said variable input impedance means exceeds the forward blocking voltage of the respective diode, said diode commences conduction and provides an electrical path around said fixed value resistance, said path having a resistance which is an inverse function of the magnitude of the applied voltage.

References Cited
UNITED STATES PATENTS 3,027,524  3/1962  May _____ 307—88.5
3,119,029  1/1964  Russell _____ 328—217

ARTHUR GAUSS, *Primary Examiner.*

J. BUSCH, R. H. PLOTKIN, *Assistant Examiners.*